(12) United States Patent
Foss et al.

(10) Patent No.: US 7,913,782 B1
(45) Date of Patent: Mar. 29, 2011

(54) PULL BEHIND UNIT FOR USE WITH A SELF-PROPELLED UNIT

(75) Inventors: David A Foss, Greenbush, MN (US); Michael R. Trihey, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 207 days.

(21) Appl. No.: 12/189,995

(22) Filed: Aug. 12, 2008

Related U.S. Application Data

(60) Provisional application No. 60/956,671, filed on Aug. 17, 2007.

(51) Int. Cl.
*B60D 1/00* (2006.01)
(52) U.S. Cl. .................................................. 180/14.4
(58) Field of Classification Search .............. 180/14.3, 180/14.4, 14.1
See application file for complete search history.

(56) References Cited

U.S. PATENT DOCUMENTS

| | | | |
|---|---|---|---|
| 1,436,658 A | 11/1922 | Jonkhoff | |
| 2,140,109 A | 12/1938 | Kellar | |
| 3,225,850 A * | 12/1965 | Simmons et al. | 180/14.4 |
| 3,442,345 A * | 5/1969 | Berger | 180/24.11 |
| 3,454,123 A * | 7/1969 | Lewis | 180/23 |
| 3,473,619 A | 10/1969 | Dion | |
| 3,563,329 A | 2/1971 | Licari | |
| 3,802,526 A * | 4/1974 | Mueller et al. | 180/14.4 |
| 3,860,081 A | 1/1975 | Moll et al. | |
| 3,891,003 A | 6/1975 | Duttarer et al. | |
| 3,929,198 A | 12/1975 | Dalton | |
| 4,023,638 A | 5/1977 | Holmes et al. | |
| 4,502,558 A | 3/1985 | Mauri | |
| 4,795,135 A * | 1/1989 | Scott | 254/327 |
| 4,878,451 A | 11/1989 | Siren | |
| 5,462,131 A | 10/1995 | Eidam et al. | |
| 6,877,758 B2 | 4/2005 | Colistro | |
| 7,093,681 B2 | 8/2006 | Strain | |
| 7,093,682 B2 | 8/2006 | Cooper | |
| 7,220,209 B1 | 5/2007 | Dahl et al. | |
| 2002/0195795 A1 * | 12/2002 | Brown | 280/492 |

* cited by examiner

*Primary Examiner* — Kevin Hurley
(74) *Attorney, Agent, or Firm* — Baker & Daniels LLP

(57) ABSTRACT

A vehicle and a pull behind unit are disclosed. The pull behind unit may be attached to a hitch of the vehicle. The pull behind unit may include powered ground engaging members which may be powered by an engine of the vehicle or an engine of the pull behind unit.

14 Claims, 10 Drawing Sheets

US 7,913,782 B1

PULL BEHIND UNIT FOR USE WITH A SELF-PROPELLED UNIT

RELATED APPLICATION

This application claims the benefit of U.S. Provisional Patent Application No. 60/956,671, filed Aug. 17, 2007, the entire disclosure of which is expressly incorporated by reference herein.

FIELD

The present invention relates generally to pull behind units for attachment to a self-propelled vehicle and in particular to pull behind units including a drive member.

BACKGROUND

It is known to attach pull behind units to various vehicles, including utility vehicles, all-terrain vehicles ("ATV"), tractors, and other suitable vehicles. Examples of pull behind units include trailers and wagons. As used herein the term "trailer" means a pull behind unit including one or more axles none of which are steering axles. As used herein the term "wagon" means a pull behind unit including one or more axles wherein at least one of the axles is a steering axle.

Further, it is known to power an apparatus of the pull behind unit through a drive member connection with an output drive member of the vehicle, such as a power take off ("PTO").

SUMMARY

The present disclosure relates to pull behind units, pull behind units in combination with a vehicle, and/or drive systems of a pull behind unit.

According to an exemplary embodiment of the present disclosure, a pull behind unit for attachment to a hitch of a self-propelled vehicle and an output drive member of the self-propelled vehicle is provided. The vehicle having a wheel base of a first distance. The trailer including a frame and at least two ground engaging devices supporting the frame including a first, forwardmost ground engaging device. All of the ground engaging members being non-steering ground engaging members. The trailer further including a drive unit supported by the frame. The drive unit coupled to at least one of the ground engaging devices to power the movement of the at least one of the ground engaging-devices. The trailer further including a pull behind unit drive member coupled to an input of the drive unit and adapted to be coupled to the output drive member of the self-propelled vehicle and a pull behind unit hitch adapted to be coupled to the hitch of the self-propelled vehicle. The trailer hitch and the hitch of the self-propelled vehicle cooperating to define a hitch pivot point. A second distance extending from the hitch pivot point to a rotation axis of the first, forwardmost ground engaging device is within a range from up to about 20 percent shorter than the first distance to up to about 50 percent longer than the first distance.

In another exemplary embodiment of the present disclosure, a combination of a self-propelled vehicle and a pull behind unit is provided. The combination comprising a vehicle hitch supported by the self-propelled vehicle and a pull behind unit hitch supported by the pull behind unit, the pull behind unit hitch configured to couple to the vehicle hitch. The pull behind unit hitch and the vehicle hitch cooperating to define a hitch pivot point. The combination further comprising a vehicle output drive member supported by the vehicle and a pull behind unit drive member supported by the pull behind unit. The pull behind unit drive member configured to couple to the vehicle output drive member. The pull behind unit drive member and the vehicle drive member cooperating to define a drive member pivot point. The drive member pivot point being generally aligned vertically with the hitch pivot point.

In a further exemplary embodiment of the present disclosure, a method of powering the movement of a combination of a self-propelled vehicle and a self-propelled pull behind unit removably coupled to the self-propelled vehicle is provided. The method comprising the steps of providing a first engine supported by the self-propelled vehicle, the first engine coupled to at least one of a first plurality of ground engaging members of the self-propelled vehicle to power movement of the combination of self-propelled vehicle and the self-propelled pull behind unit; providing a second engine supported by the self-propelled pull behind unit, the second engine coupled to at least one of a second plurality of ground engaging members of the self-propelled pull behind unit to power movement of the combination of self-propelled vehicle and the self-propelled pull behind unit; operating the combination of the self-propelled vehicle and the self-propelled pull behind unit in a first mode wherein the first engine powers the self-propelled vehicle and the pull behind unit and in a second mode wherein the second engine powers the self propelled vehicle and the pull behind unit.

In yet another exemplary embodiment of the present disclosure, a trailer for attachment to a self-propelled vehicle and an output drive member of the self-propelled vehicle is provided. The trailer including a frame; at least two ground engaging devices supporting the frame; a drive unit supported by the frame, the drive unit coupled to at least one of the ground engaging devices to power the movement of the at least one of the ground engaging-devices; a clutch supported by the frame and spaced apart from the drive unit of the trailer; a first drive member coupled to an input of the drive unit and coupled to the clutch; a second drive member coupled to the clutch and adapted to be coupled to the output drive member of the self-propelled vehicle; and a hitch adapted to be coupled to the self-propelled vehicle. The second drive member communicates power from the self-propelled vehicle to the drive unit of the trailer through the clutch and the first drive member.

In still another exemplary embodiment of the present disclosure, a trailer for attachment to a self-propelled vehicle and an output drive member of the self-propelled vehicle. The self-propelled vehicle including a vehicle hitch, a first vehicle stop positioned to a first side of the vehicle hitch and a second vehicle stop positioned to a second side of the vehicle hitch. The trailer including a frame; at least two ground engaging devices supporting the frame; a powered apparatus supported by the frame; a drive member operatively coupled to the powered apparatus and adapted to be coupled to the output drive member of the self-propelled vehicle; a trailer hitch coupled to the frame, the trailer hitch adapted to be coupled to the vehicle hitch; a first trailer stop supported by the frame and positioned on a first side of the trailer hitch, a second trailer stop supported by the frame and positioned on a second side of the trailer hitch. The first trailer stop cooperates with the first vehicle stop to limit an angular rotation of the trailer in a first direction and the second trailer stop cooperates with the second vehicle stop to limit the angular rotation of the trailer in a second direction opposite the first direction.

The above mentioned and other features of this invention, and the manner of attaining them, will become more apparent

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a pull-behind unit for use with an utility vehicle, it should be understood that the principles apply equally to pull behind units for other types of vehicles, including all-terrain vehicles, tractors, lawn movers and other suitable vehicles.

Figure 1:
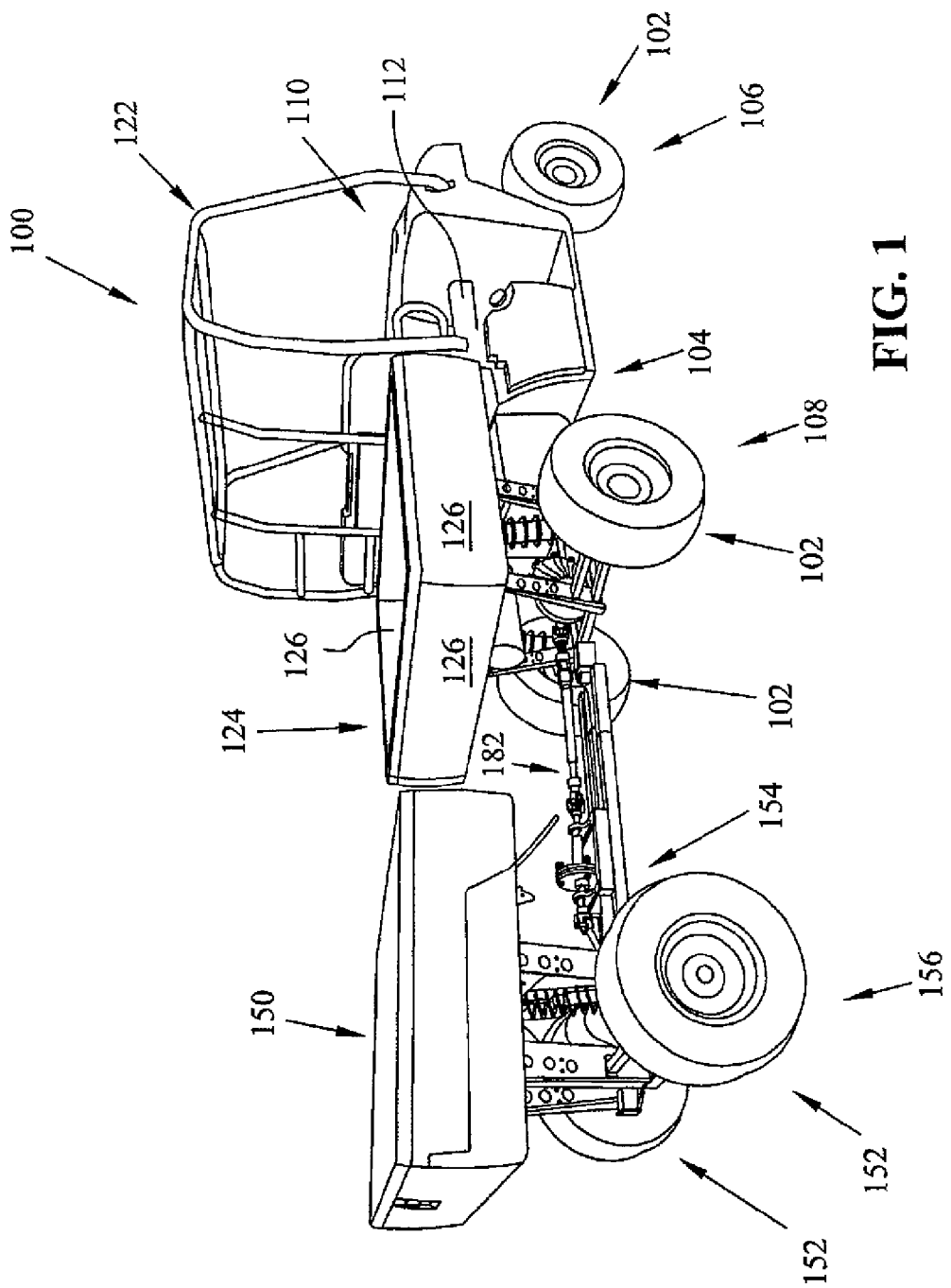
FIG. 1 is a rear perspective view of a self-propelled vehicle and a pull behind unit.

Referring to FIG. 1, an illustrative embodiment of a self-propelled vehicle 100 and an illustrative embodiment of a pull behind unit 150 are shown. Vehicle 100 includes a plurality of ground engaging members 102, illustratively wheels, which support a frame 104. A first set of wheels, one on each side of vehicle 100, generally correspond to a front axle 106. A second set of wheels, one on each side of vehicle 100, generally correspond to a second axle 108. In one embodiment, vehicle 100 includes a third set of wheels, one on each side of vehicle 100 which generally correspond to a third axle. In one embodiment, the third axle is mounted on a swingarm which is coupled to frame 104. In one embodiment, one or more of the wheels may be replaced with tracks, such as the Prospector II Tracks available from Polaris Industries, Inc. located at 2100 Highway 55 in Medina, Minn. 55340. In one embodiment, the tracks provide about 10:1 ground pressure advantage relative to wheels.

Vehicle 100 includes an operator area 110 which includes seating 112 for one or more passengers. Operator area 110 further includes a plurality of operator controls 120 (see FIG. 2) by which an operator may provide input into the control of vehicle 100. Controls 120 include a steering wheel 116 (see FIG. 8) which is rotated by the operator to change the orientation of one or more of ground engaging members 102, such as the wheels associated with front axle 106, to steer vehicle 100. In one embodiment, steering wheels 116 changes the orientation of the wheels of front axle 106 and second axle 108 to provide four wheel steering.

Controls 120 also include a plurality of foot pedals 118 actuatable by the operator to control the acceleration and speed of vehicle 100 through the control of an engine 130 (see FIG. 2) and a braking system. In one embodiment, pull behind unit 150 uses the braking system of vehicle 100. In one embodiment, pull behind unit 150 includes a separate brake system which may be actuated independent of or in concert with the braking system of vehicle 100.

Frame 104 includes a roll cage 122 extending above operator area 110. Roll cage 122 is provided to protect the occupants of operator area 110 if vehicle 100 tips or rolls over.

Vehicle 100 further includes a cargo box 124 supported by frame 104 and positioned generally over second axle 108. In one embodiment, cargo box 124 includes wall panels 126 which are removably coupled to a base of cargo box 124.

Figure 2:
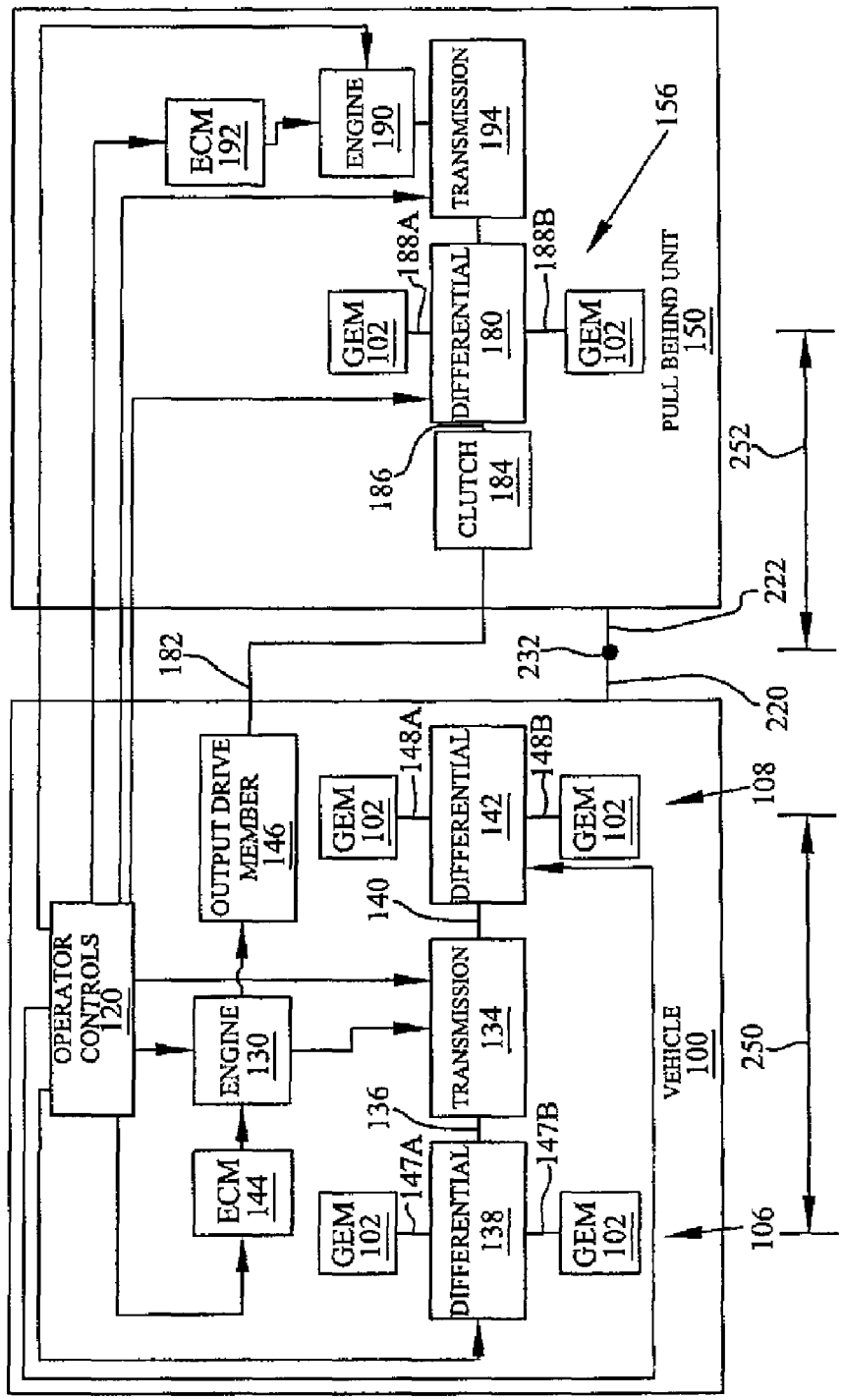
FIG. 2 is a representative view of a self-propelled vehicle and a pull behind unit.

Referring to FIG. 2, self-propelled vehicle 100 includes an engine 130 to power self-propelled vehicle 100 and a transmission 134 coupled to engine 130. In one embodiment, engine 130 is an internal combustion engine which runs on a suitable fuel. Suitable fuels include gasoline, diesel, propane and other combustible fuels. In one embodiment, a multifuel engine capable of utilizing various fuels is implemented. Exemplary engines are disclosed in U.S. patent application Ser. No. 11/445,731, filed Jun. 2, 2006, the disclosure of which is expressly incorporated by reference herein. In one embodiment, engine 130 is a hybrid electric engine. In one embodiment, engine 130 is an electric drive engine.

Transmission 134 may include a shiftable transmission and/or a continuously variable transmission ("CVT"). Transmission is coupled to a front drive shaft 136 coupled to a front differential 138 and to a rear drive shaft 140 coupled to a rear differential 142.

Engine 130, in one embodiment, includes a shiftable transmission which is shiftable between a high gear for normal forward driving, a low gear for towing, a reverse gear for driving in reverse, and a park setting which locks the output drive of the shiftable transmission from rotating. Exemplary shiftable transmissions and CVTs are disclosed in U.S. Pat. No. 6,725,962 and U.S. Pat. No. 6,978,857, the disclosures of which are expressly incorporated by reference herein.

The operation of engine 130 and transmission 134 are controlled through one or both of operator inputs 120 and an electrical control module 144 ("ECM") having software to control the operation of engine 130 based on operator inputs 120 and sensors which monitor engine 130 and software to control the operation of differentials 138 and 142. In one embodiment, the software of ECM 144 controls the operation of differentials 138 and 142 of vehicle 100 and differential 180 of pull behind unit 150.

Vehicle 100 is coupled to differential 180 through an output drive member 146 which is coupled to a drive shaft 182 of pull behind unit 150. Drive shaft 182 is coupled to a clutch 184 which is in turn connected to differential 180 through drive shaft 186. Differential 180 is one example of a drive unit. Exemplary drive units may be used to power an apparatus supported by pull behind vehicle 150. Exemplary apparatus include generators and other suitable devices.

Figure 3:
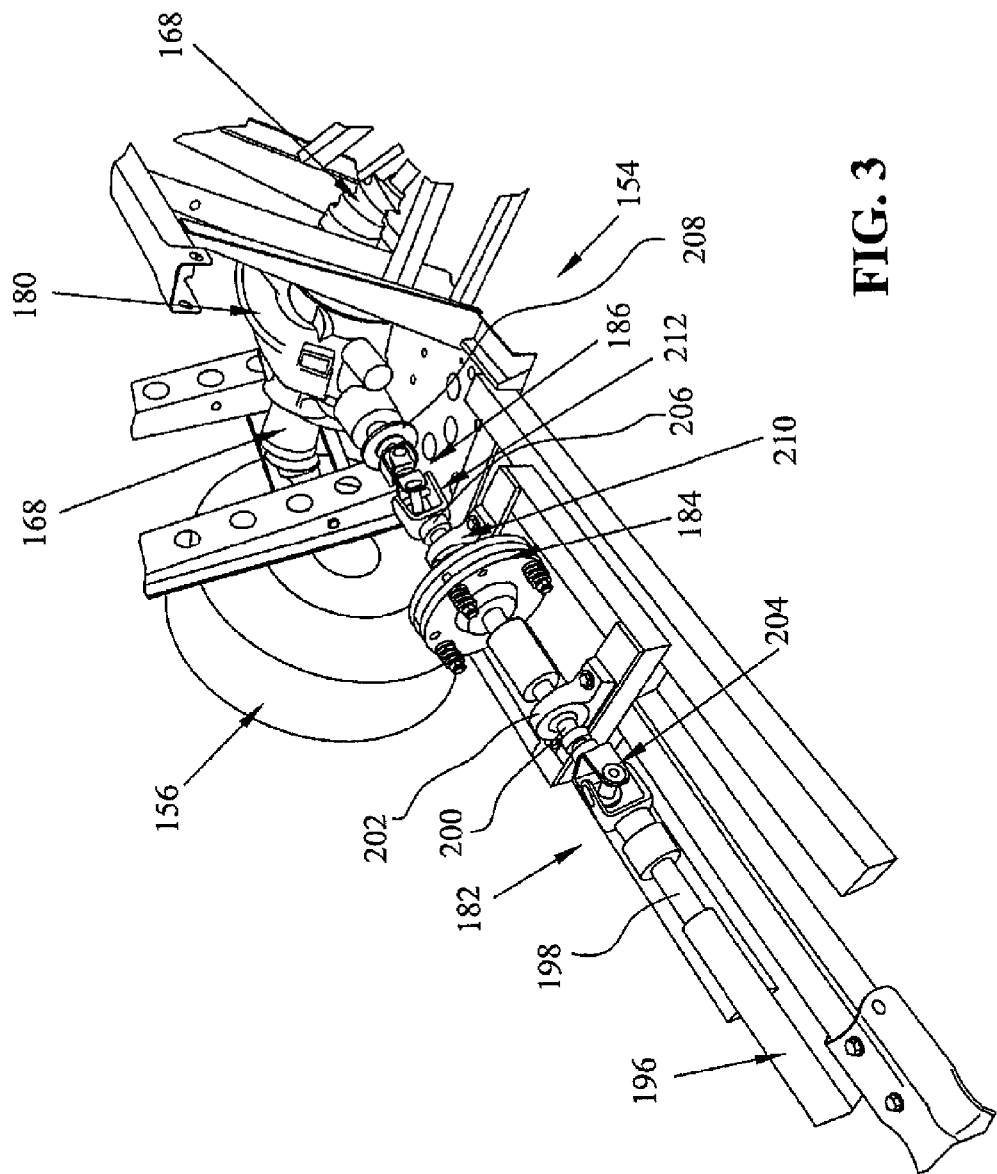
FIG. 3 is a perspective view of a drive member of pull behind vehicle.

Referring to FIG. 3, in one embodiment, drive shaft 182 includes a first portion 196, a second portion 198, and a third portion 200. Second portion 198 receives first portion 196. Second portion 198 and first portion 196 cooperate to provide a telescoping member; thereby providing a length adjustment of drive shaft 182. Third portion 200 is supported by a pillow block 202. The combination of second portion 198 and first portion 196 is rotatable relative to third portion 200 through a u-joint 204.

In one embodiment, drive shaft 186 includes a first portion 206 and a second portion 208. First portion 206 is supported by a pillow block 210. Second portion 208 is coupled to an input shaft of differential 180. First portion 206 is coupled to second portion 208 through two u-joints 212. First portion 206 is coupled to third portion 200 of drive member 182 through clutch 184. Clutch 184 is illustratively shown as a slip clutch. In one embodiment, clutch 184 is an electric clutch operatively coupled to operator controls 120 that may be used to control an on-demand use of axle 156. In one embodiment, clutch 184 is an over-running clutch.

Transmission 134 is coupled to front differential 138 and rear differential 142 through drive shafts 136 and 140, respectively. Drive shafts 136 and 140, like other drive shafts mentioned herein, may include multiple components and are not limited to straight shafts.

Front differential 138 includes two output shafts 147A and 147B, each coupling a respective wheel 102 of front axle 106 to differential 138. Rear differential 142 includes two output shafts 148A and 148B, each coupling a respective wheel 102 of second axle 108 to differential 142.

Differential 180 of pull behind unit 150 includes two output shafts 188A and 188B, each coupling a respective wheel 102 of axle 156 to differential 180. As such, the wheels 152 of pull behind unit 150 are coupled to rear differential 180 and receive power from output drive member 146 of self-propelled vehicle 100. In one embodiment, output drive member 146 is a ground power take off wherein power is not transferred to drive shaft 182 unless self-propelled vehicle 100 is providing power to one or more of ground engaging member 102 to power self-propelled vehicle 100. In one embodiment, output drive member 146 is a thru shaft of differential 142.

Figure 10:
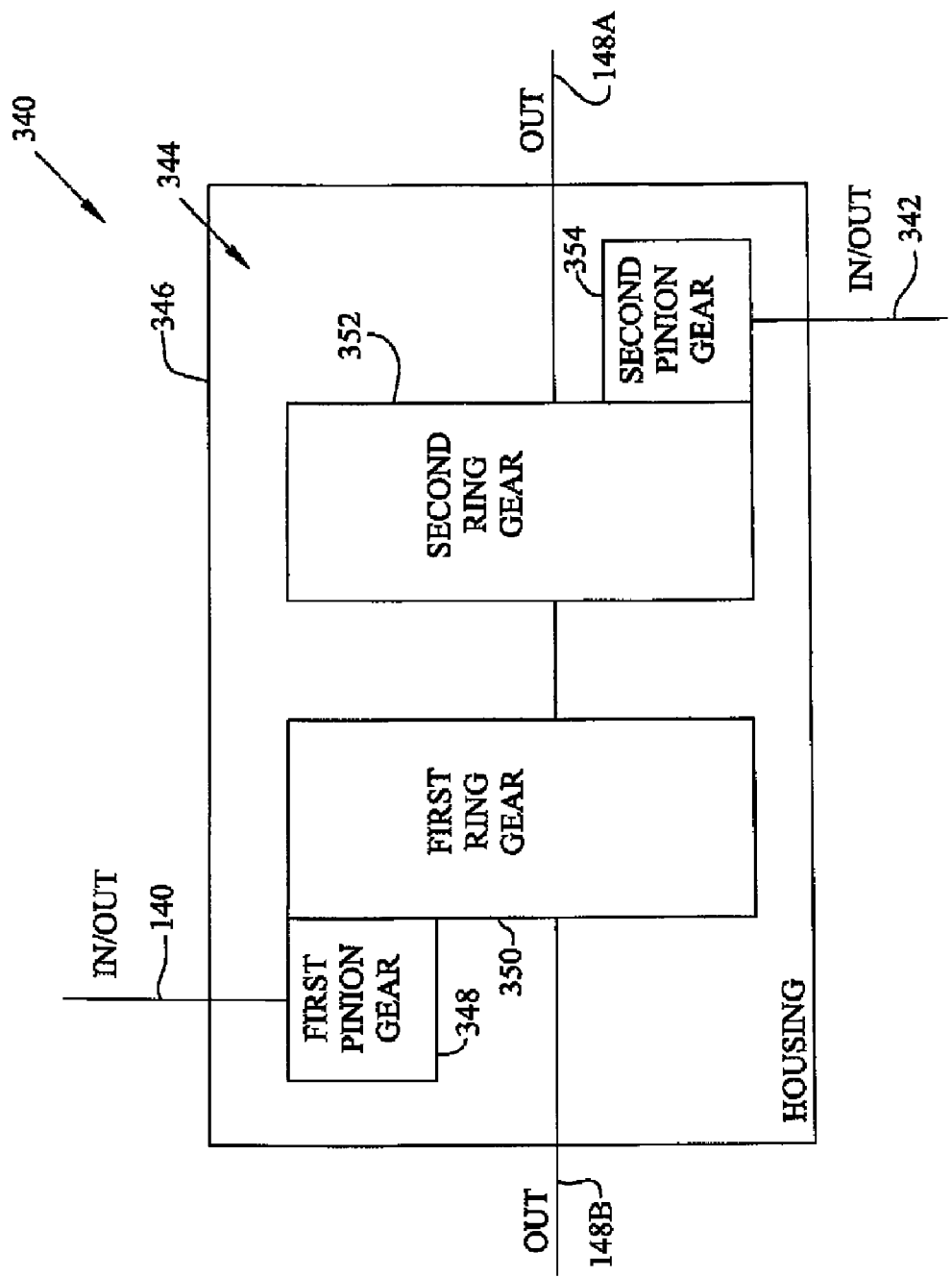
FIG. 10 is a representative view of a drive configuration for an exemplary rear differential.

An exemplary differential 340 having a rear output shaft which is not a thru shaft is represented in FIG. 10. Differential 340 replaces differential 142. Differential 340 still includes a connection to drive shaft 140 and output shafts 148A and 148B. A second drive shaft 342 is provided opposite drive shaft 140 and serves as the output drive member which powers pull behind unit 150. Drive shafts 140 and 342 are noted as being "IN/OUT" shafts because as explained herein, in one embodiment, pull behind unit 150 includes a power generating device 190 and may be used to power vehicle 100.

Shafts 140 and 342 are coupled together through a gear set 344 which is disposed within a housing 346. Gear set 344 includes a first pinion gear 348 coupled to shaft 140. First pinion gear 348 has teeth which engage the teeth on a first ring gear 350. A second ring gear 352 is coupled to first ring gear 350 and includes teeth which engage a second pinion gear 354. Second pinion gear 354 is coupled to shaft 342.

Various configurations of front differential 138, rear differential 142, and differential 180 of pull behind unit 150 are contemplated. Regarding front differential 138, in one embodiment front differential 138 has a first configuration wherein power is provided to both of the wheels of front axle 106 and a second configuration wherein power is provided to one of the wheels of front axle 106, such as the wheel having the less resistance relative to the ground.

In one embodiment, front differential 138 includes active decent control ("ADC"). ADC is an all wheel drive system that provides on-demand torque transfer to the front wheels with a front drive and is also capable of providing engine braking torque to the front wheels with a back drive. Both the front drive and the back drive are portions of front differential 138 and may be active or inactive. In the case of the front drive, when active power is provided to both of the wheels of front axle 106 and when inactive power is provided to one of the wheels of front axle 106. In the case of the back drive, when active engine braking is provided to the wheels of front axle 106 and when inactive engine braking is not provided to the wheels of front axle 106.

The front drive aspect of front differential 138 is accomplished by the use of two bi-directional over running clutches located in a centralized front gearcase as explained in more detail in U.S. Pat. No. 5,036,939, the disclosure of which is expressly incorporated by reference herein. The engine braking aspect of the back drive of front differential 138 is accomplished by coupling clutch packs between each of the front driving wheels and the front gearcase, such that the clutch packs are selectively engaged when specific vehicle requirements are met.

Regarding rear differential 142, in one embodiment, rear differential 142 is a locked differential wherein power is provided to both of the wheels of second axle 108 through output shafts 148A and 148B. In one embodiment, rear differential 142 is a lockable/unlockable differential relative to output shafts 148A and 148B. When rear differential 142 is in a locked configuration power is provided to both wheels of second axle 108 through output shafts 148A and 148B. When rear differential 142 is in an unlocked configuration, power is provided to one of the wheels of second axle 108, such as the wheel having the less resistance relative to the ground, through output shafts 148A and 148B.

Regarding differential 180, in one embodiment, differential 180 is a locked differential wherein power is provided to both of the wheels of axle 156 through output shafts 188A and 188B. In one embodiment, differential 180 is a lockable/unlockable differential relative to output shafts 188A and 188B. When differential 180 is in a locked configuration power is provided to both wheels of axle 156 through output shafts 188A and 188B. When differential 180 is in an unlocked configuration, power is provided to one of the wheels of axle 156, such as the wheel having the less resistance relative to the ground, through output shafts 188A and 188B.

In one embodiment, differential 180 is the same as one or both of front differential 138 and rear differential 142. As such, if one of front differential 138 and rear differential 142 fails, differential 180 may be removed from pull behind unit 150 to replace the failed one of front differential 138 and rear differential 142.

In one embodiment, vehicle 100 operates in three modes: on-demand four-wheel drive (providing greater traction), two-wheel drive with a locked rear differential (providing good traction), and two-wheel drive with an open or unlocked rear differential (turf mode). An operator may select the mode of operation through a control input 120. Additional details regarding the structure and operation of an exemplary vehicle which operates in the above-mentioned three modes of operation is provided in U.S. Pat. No. 7,220,209 assigned to Polaris Industries Inc., the disclosure of which is expressly incorporated by reference herein. Also exemplary differentials are shown in U.S. Pat. Nos. 4,995,853 and 3,732,752, the disclosures of which are expressly incorporated by reference herein.

In one embodiment, differential 180 of pull behind unit 150 may be locked or unlocked. In one embodiment, differential 180 has the same configuration as rear differential 142. In one embodiment all three of differentials 138, 142, and 180 may be locked or unlocked and an operator may select the configuration of each or select a input (such as all-wheel drive) that specifies the configuration for each of differentials 138, 142, and 180.

In one embodiment, pull behind unit 150 includes an engine 190 having an associated ECM 192. Engine 190 is coupled to differential 180 through a transmission 194. Engine 190 may provide power to axle 156 through differential 180 when engine 130 is not running. Further, in one embodiment, wherein output drive member 146 is a thru shaft of rear differential 142, engine 190 may power second axle 108 through drive shaft 182. In one embodiment, engine 190 is a quieter running engine than engine 130, such as an electric motor while engine 130 is an internal combustion engine.

In one embodiment, a user of self-propelled vehicle 100 and pull behind unit 150 may use engine 190 to power the combination of self-propelled vehicle 100 and pull behind unit 150 at times that stealth is required, such as a military application wherein the user does not want to alert the enemy as to their location. The user would then use engine 130 during normal operations. In one embodiment, vehicle 100 and/or pull behind unit 150 includes IR lights and traditional lights. The IR lights being used during stealth operation as needed due to visibility. Additional details regarding exemplary lights are provided in U.S. Pat. No. 7,125,134, assigned to Polaris Industries Inc., the disclosure of which is expressly incorporated by reference herein.

In one embodiment, engine 190 and/or engine 130 are selected from one of an internal combustion engine, an electric drive, and other suitable power sources.

An exemplary pull behind unit 150 is also shown in FIG. 1. Pull behind unit 150 includes a frame 154 which is supported by a plurality of ground engaging members 152, illustratively wheels. A first set of wheels, one on each side of pull behind unit 150, generally correspond to a first axle 156. In one embodiment, pull behind unit 150 includes at least two additional ground engaging members 152 which correspond to one or more additional axles. In one embodiment, at least one axle of pull behind unit 150 is a steering axle. In the illustrated embodiment, axle 156 is a non-steering axle.

Figure 5:
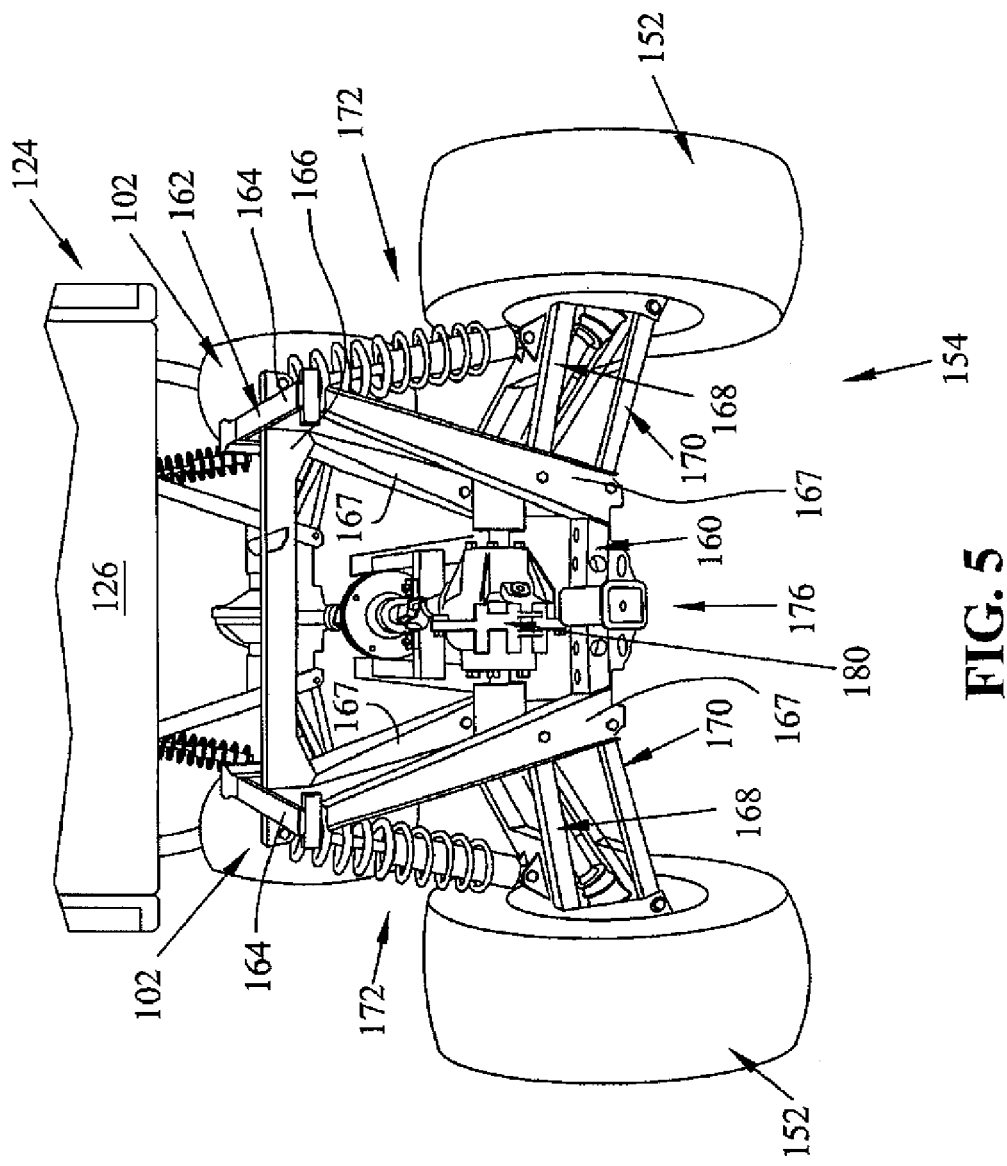
FIG. 5 is generally a rear view of the self-propelled vehicle and a pull behind unit of FIG. 1.

Referring to FIG. 5, frame 154 includes a lower frame 160 and an upper frame 162. Upper frame 162 includes a pair of longitudinal frame members 164 and a cross frame member 166. Upper frame 162 is coupled to lower frame 160 through a plurality of generally upwardly extending frame members 167. An upper set of A-frame suspension members 168 are rotatably coupled to generally upwardly extending frame members 167 and a lower set of A-frame suspension members 170 are rotatably coupled to generally upwardly extending frame members 167. Ground engaging members 152 are coupled to frame 154 through upper set of A-frame suspension members 168 and lower set of A-frame suspension members 170.

A shock member 172 is rotatably coupled to cross frame member 166 and to upper set of a-frame suspension members 168. Exemplary shock members 172 include springs and gas shocks. The shock member 172 for each of ground engaging members 152 of pull behind unit 150 are independent resulting in pull behind unit 150 having an independent suspension. In one embodiment, shown in FIGS. 8 and 9, a pull behind unit is provided which does not include an independent suspension.

As explained in more detail herein, frame 154 couples pull behind unit 150 to self-propelled vehicle 100 through a hitch. Pull behind unit 150 is further coupled to self-propelled vehicle 100 through a drive member 182 (see FIG. 1).

In one embodiment, lower frame 160, upper frame 162, generally upwardly extending frame members 167, upper set of A-frame suspension members 168, lower set of A-frame suspension members 170, shock member 172, and ground engaging members 152 are identical to components used in relation to second axle 108 of self-propelled vehicle 100. As such, components may be scavenged from pull behind unit 150 in order to repair self-propelled vehicle 100 as needed.

Pull behind unit 150 further includes a receiver hitch 176 which may be coupled to a hitch (not shown). As such, a second instance of pull behind unit 150 may be coupled to the illustrated instance of pull behind unit 150. In one embodiment, the second instance of pull behind unit 150 does not include a powered axle. In one embodiment, the second instance of pull behind unit 150 includes a powered axle which is coupled to an output shaft of differential 180. Additional instances of pull behind unit 150 may be daisy-chained onto the second instance of pull behind unit 150.

Figure 6:
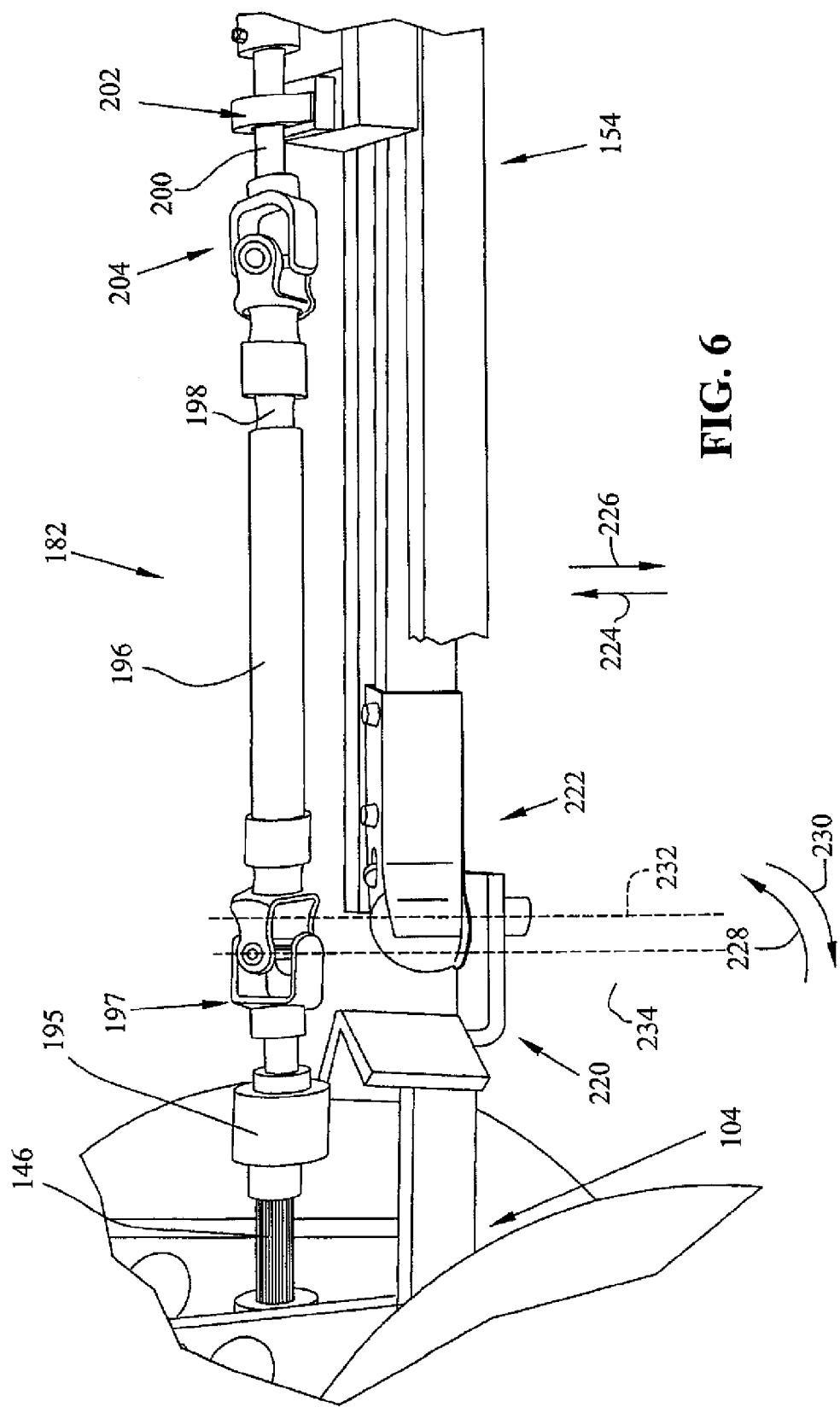
FIG. 6 is a generally side view of the hitch connection and the drive member connection of the self-propelled vehicle and a pull behind unit of FIG. 1.

Referring to FIG. 6, self-propelled vehicle 100 includes a hitch member 220 which is coupled to frame 104. Similarly, pull behind unit 150 includes a hitch member 222 which is coupled to frame 104. Hitch member 220 and hitch member 222 cooperate to couple pull behind unit 150 to self-propelled vehicle 100. Illustratively, hitch member 220 and hitch member 222 are ball hitch components. In one embodiment, hitch member 220 and hitch member 222 are pintle hitch components.

Figure 4:
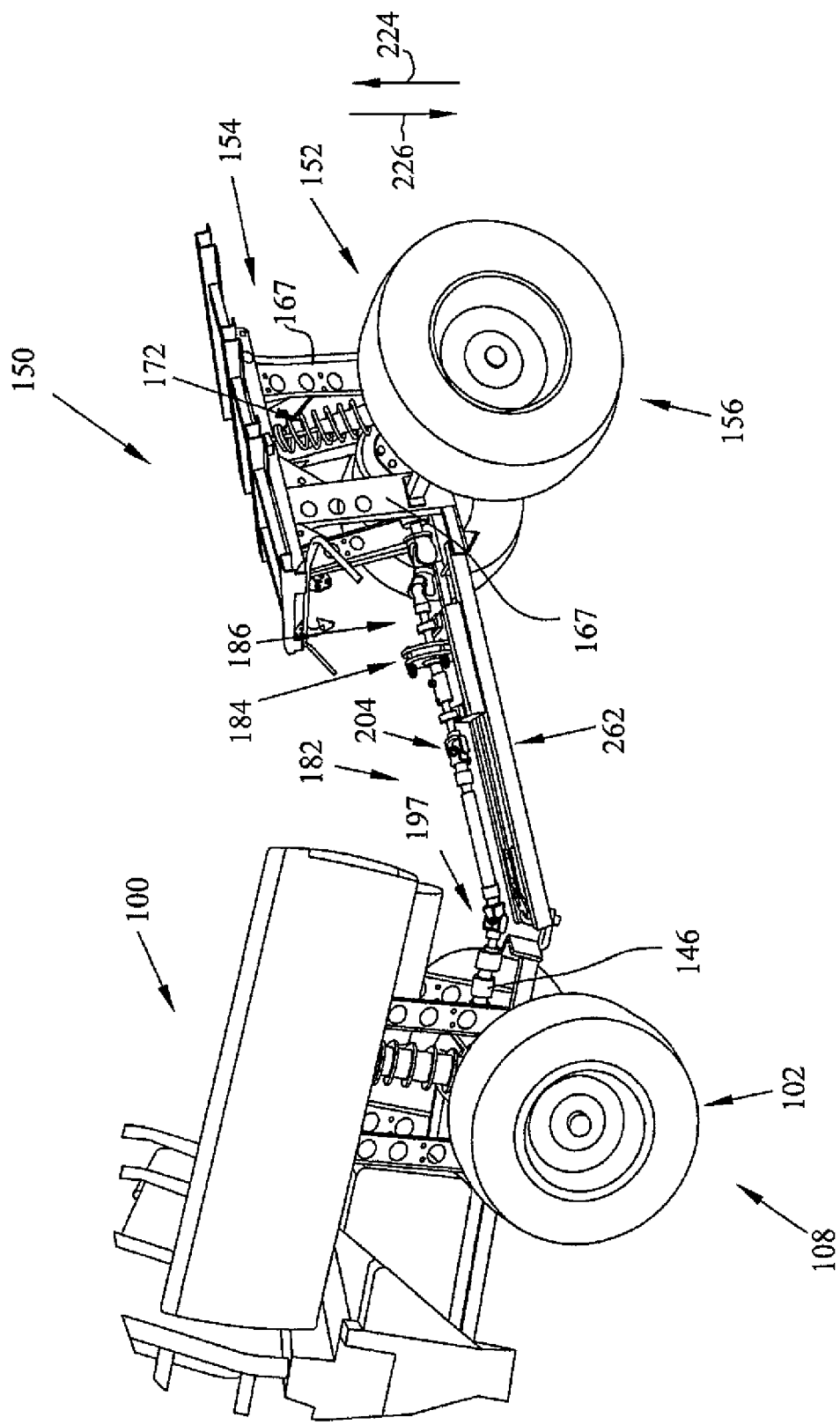
FIG. 4 is a generally side view of the self-propelled vehicle and a pull behind unit of FIG. 1.

Hitch member 220 and hitch member 222 permit the rotation of hitch member 222 relative to hitch member 220. For instance, hitch member 222 may rotate generally upward in direction 224 and generally downward direction 226. A rotation in direction 224 is illustrated in FIG. 4. The upward and downward rotation of hitch member 222 relative to hitch member 220 permits the combination of self-propelled vehicle 100 and pull behind unit 150 to travel over rough terrain while keeping ground engaging members 102 and ground engaging members 152 on the ground. This facilitates improved maneuverability over various terrains, including uphill, downhill, and obstacles, while keeping drive wheels on the ground. In one embodiment, all of ground engaging member 102 and ground engaging member 152 remain on the ground when the combination of self-propelled vehicle 100 and pull behind unit 150 are going over obstacles.

Further, hitch member 222 is able to rotate in direction 228 and direction 230 about an axis 232. This provides the combination of self-propelled vehicle 100 and pull behind unit 150 with a shorter turning radius than a traditional 6×6 powered vehicle. In one embodiment, the turning radius of the combination of self-propelled vehicle 100 and pull behind unit 150 is about 148 inches. In one embodiment, the turning radius of the combination of self-propelled vehicle 100 and pull behind unit 150 is up to about 148 inches. As discussed herein, in one embodiment, limits are provided on self-propelled vehicle 100 and pull behind unit 150 which limit the rotation range of hitch member 222 relative to hitch member 220 in direction 228 and direction 230.

Drive shaft 182 further includes a fourth portion 195 which is coupled to output drive member 146 of self-propelled vehicle 100. Fourth portion 195 is coupled to first portion 196 through a u-joint 197. First portion 196 is rotatable relative to fourth portion 195 through u-joint 197. U-joint 197 permits the rotation of first portion 196 in direction 224 and direction 226. Further, u-joint 197 permits the rotation of first portion 196 in direction 228 and direction 230 about axis 234. In one embodiment, axis 232 and axis 234 are co-axial. In one embodiment, axis 232 and axis 234 are generally co-axial. In one embodiment, axis 232 and axis 234 are separated by up to about one inches, up to about two inches, or up to about four inches. Axis 232 is a hitch member pivot point providing rotation in directions 228, 230. Axis 234 is a drive member pivot point providing rotation in directions 228, 230.

Referring back to FIG. 2, a distance 250 from axle 106 to axle 108 is represented as a wheel base of self-propelled vehicle 100. Also represented in FIG. 2, is a distance 252 which is the distance from axis 232 to axle 156. In embodiments wherein pull behind unit 150 includes multiple axles, then distance 252 is the distance from axis 232 to the forwardmost axle.

In one embodiment, distance 252 is a multiple of distance 250. In one example, distance 252 is equal to distance 250. In one example, distance 252 is twice distance 250. In one embodiment, distance 252 is up to about 20 percent shorter than distance 250, up to about 10 percent shorter than distance 250, up to about 20 percent longer than distance 250, up to about 50 percent longer than distance 250.

Figure 7:
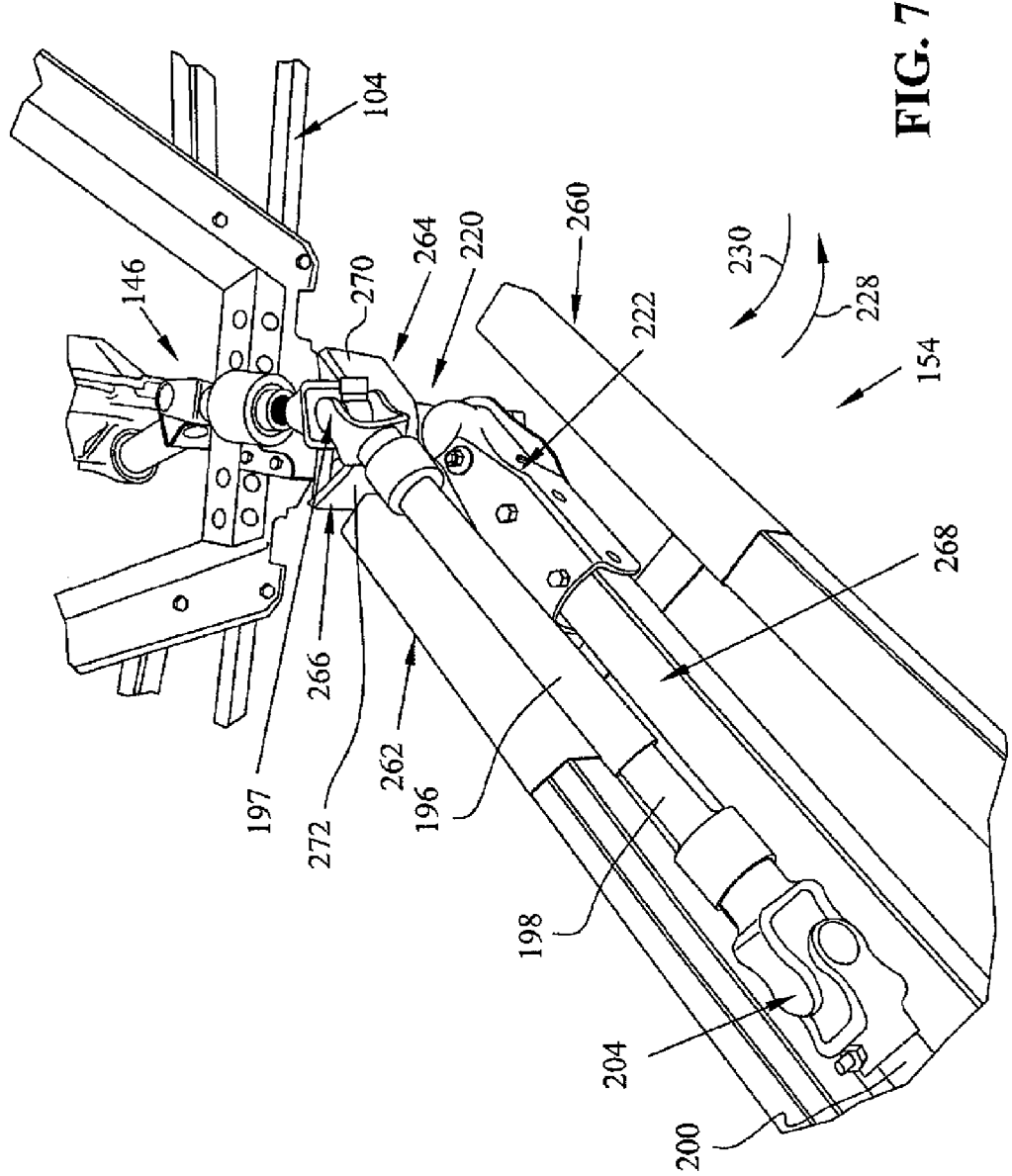
FIG. 7 is a generally top perspective view of the hitch connection and the drive member connection of the self-propelled vehicle and a pull behind unit of FIG. 1.

Referring to FIG. 7, the rotation of pull behind unit 150 about axis 232 in direction 228 and direction 230 is limited by limits provided on self-propelled vehicle 100 and pull behind unit 150. Pull behind unit 150 includes a first limit member 260 on a first side of a central frame member 268 and a second limit member 262 on a second side of central frame member 268. Central frame member 268 is coupled to hitch member 222. Each of first limit member 260 and second limit member 262 includes a respective limit surface which corresponds to a front end surface of the frame members 260, 262. A first limit member 264 and a second limit member 266 are coupled to hitch member 220 of self-propelled vehicle 100. Each of first limit member 264 and second limit member 266 includes a respective limit surface 270, 272.

The range of rotation in direction 228 of pull behind unit 150 is limited by first limit member 260 and first limit member 264. As pull behind unit 150 rotates in direction 228, the front surface of first limit member 260 abuts limit surface 270 of first limit member 264 preventing the further rotation of pull behind unit 150 in direction 228. The range of rotation in direction 230 of pull behind unit 150 is limited by second limit member 262 and second limit member 266. As pull behind unit 150 rotates in direction 230, the front surface of second limit member 262 abuts limit surface 272 of second limit member 266 preventing the further rotation of pull behind unit 150 in direction 230. In one embodiment, first limit member 260, second limit member 262, first limit member 264, and second limit member 266 provide a range of movement of up to about 40 degrees in each of directions 228 and 239. In one embodiment, the positioning of the various limit members are selected to permit a range of movement up to the range of movement of the u-joint 197.

Pull behind unit 150 may be assembled to self-propelled vehicle 100 in the following manner. Hitch member 222 is coupled to hitch member 220. Drive shaft 182 is coupled to output drive member 146.

Figure 8:
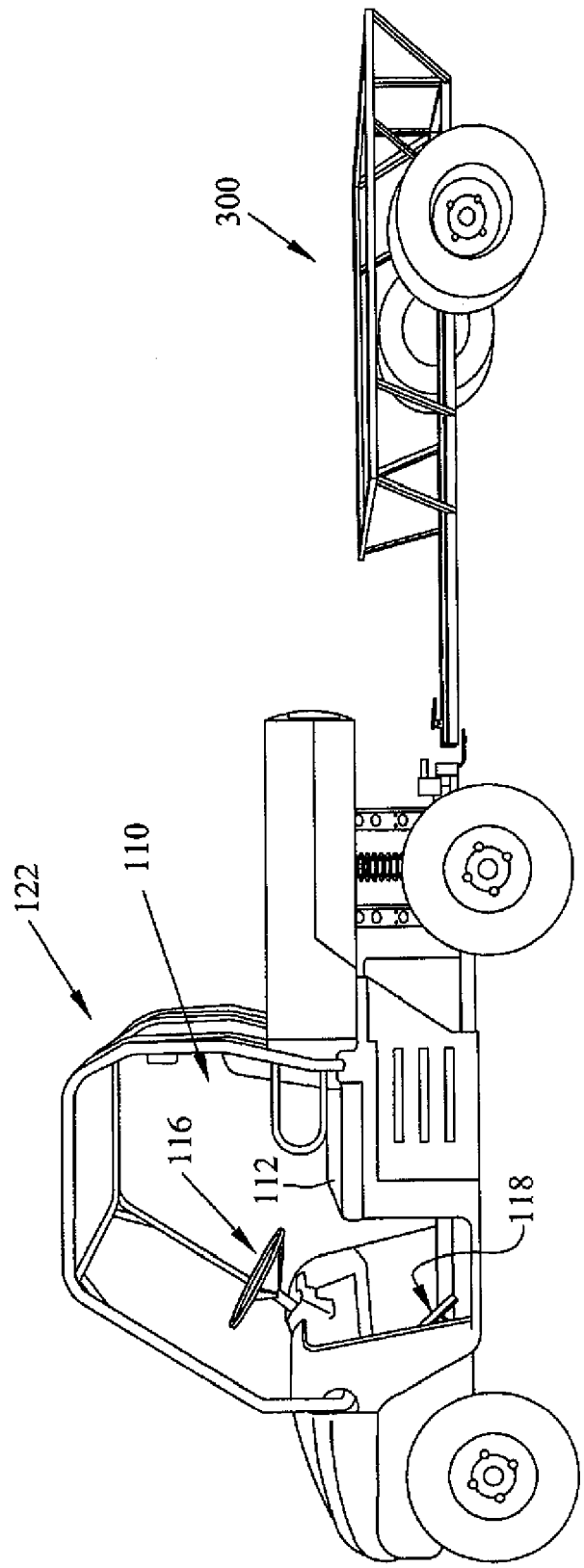
FIG. 8 is a generally side view of the self-propelled view of FIG. 1 with another pull behind unit.
Figure 9:
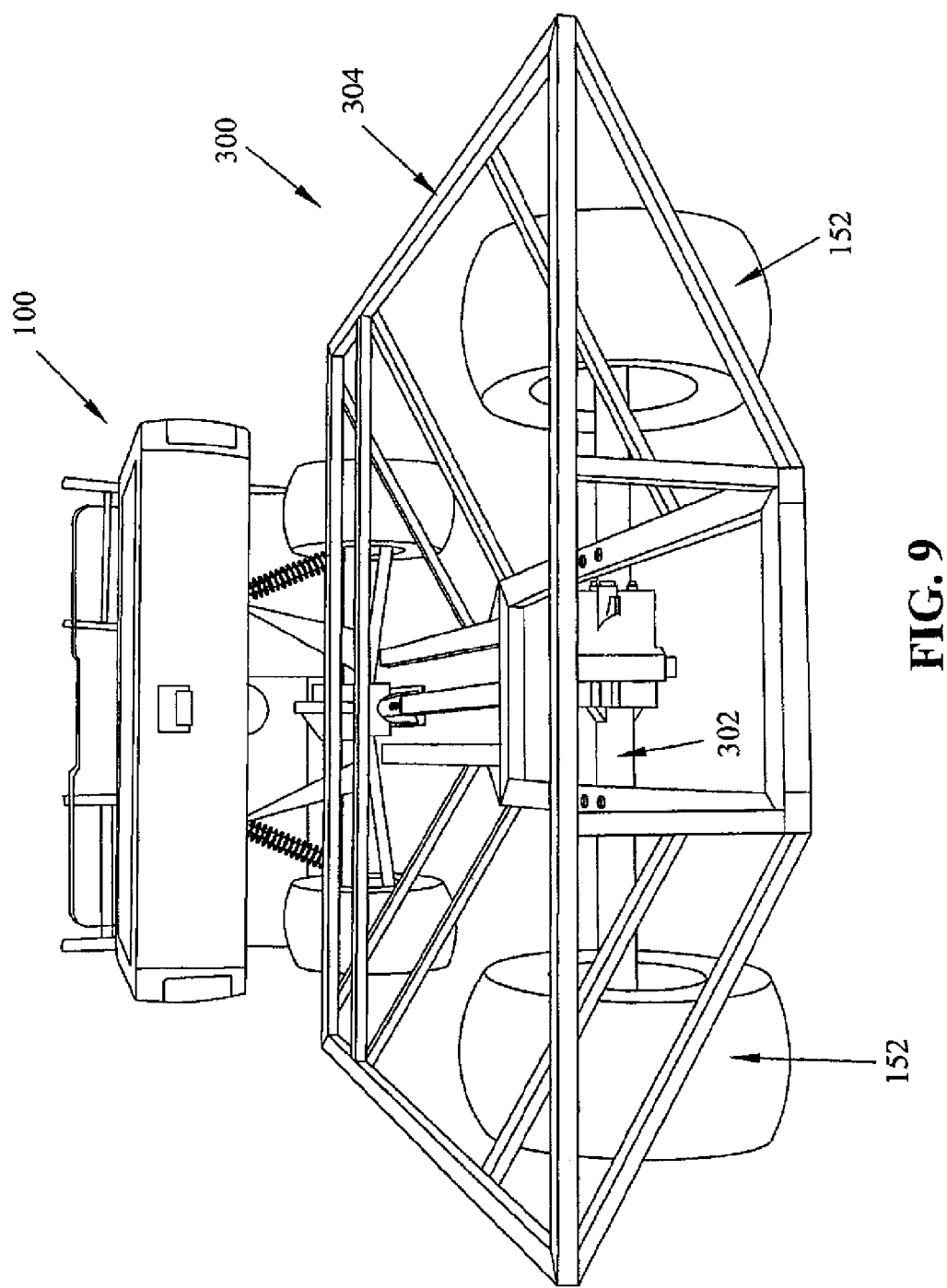
FIG. 9 is generally a rear view of the self-propelled vehicle and a pull behind unit of FIG. 8.

Referring to FIGS. 8 and 9, another pull behind unit 300 is shown. Pull behind unit 300 includes two ground engaging members 152 and a single axle 302. In one embodiment, pull behind unit 300 includes multiple axes. As shown in FIG. 9, axle 302 is a straight axle which is not coupled to self-propelled vehicle 100. Further, ground engaging members 152 of single axle 302 do not have independent suspensions.

Pull behind unit 300 further includes an upper frame 304. Upper frame 304, in one embodiment, supports a platform (not shown), such as a flatbed.

In one embodiment, one of pull behind unit 150 and pull behind unit 300 includes a hitch, a three point hitch, and a hydraulic system. In this manner the pull behind unit may be used as a platform to attach implements thereto.

Exemplary embodiments are shown in pages 1-13 of Appendix A of U.S. Provisional Patent Application No. 60/956,671, filed Aug. 17, 2007, the entire disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. In combination,
a self-propelled vehicle including a hitch and an output drive member, the self-propelled vehicle having a wheel base of a first distance; and
a pull behind unit for attachment to the self-propelled vehicle, the pull behind unit including:
 a frame;
 at least two ground engaging members supporting the frame including a first, forwardmost ground engaging member, all of the ground engaging members being non-steering ground engaging members;
 a drive unit supported by the frame, the drive unit coupled to at least one of the ground engaging devices to power the movement of the at least one of the ground engaging members;
 a pull behind unit drive member coupled to an input of the drive unit and coupled to the output drive member of the self-propelled vehicle; and
 a pull behind unit hitch coupled to the hitch of the self-propelled vehicle, the pull behind unit hitch and the hitch of the self-propelled vehicle cooperating to define a hitch pivot point, wherein a second distance extending from the hitch pivot point to a rotation axis of the first, forwardmost ground engaging member is within a range from up to about 20 percent shorter than the first distance to up to about 50 percent longer than the first distance.

2. The combination of claim 1, wherein the second distance is within a range from up to about 20 percent shorter than the first distance to up to about 20 percent longer than the first distance.

3. The combination of claim 1, wherein the second distance is within a range from up to about 10 percent shorter than the first distance to up to about 20 percent longer than the first distance.

4. The combination of claim 1, wherein the second distance is within a range from up to about 10 percent shorter than the first distance to up to about 50 percent longer than the first distance.

5. The combination of claim 1, wherein the second distance is a multiple of the first distance.

6. The combination of claim 1, wherein the first forwardmost ground engaging member and a second ground engaging member of the pull behind unit are in line laterally and both the first forward ground engaging member and the second ground engaging member are coupled to the drive unit.

7. The combination of claim 6, wherein the drive unit has a first mode wherein power is provided to both the first forwardmost ground engaging member and the second ground engaging member and a second mode wherein power is provided to only one of the first forward ground engaging member and the second ground engaging member.

8. The combination of claim 1, wherein a first suspension couples the first forwardmost ground engaging member to the frame and a second suspension, independent of the first suspension, couples the second ground engaging member to the frame.

9. The combination of claim 1, further comprising a clutch supported by the frame of the pull behind unit and spaced apart from the drive unit of the pull behind unit.

10. The combination of claim 9, wherein the pull behind drive member includes a first drive member coupled to an input of the drive unit and coupled to the clutch and a second drive member coupled to the clutch and adapted to be coupled to the output drive member of the self-propelled vehicle.

11. The combination of claim 10, wherein the clutch is a slip clutch.

12. The combination of claim 10, wherein the clutch is an electronic clutch.

13. The combination of claim 10, wherein the clutch is an over-running clutch.

14. The combination of claim 1, wherein the pull behind unit drive member is coupled to the output drive member of the self-propelled vehicle at a first location and the pull behind unit hitch is coupled to the hitch of the self-propelled vehicle at a second location spaced apart from the first location.

* * * * *

UNITED STATES PATENT AND TRADEMARK OFFICE
CERTIFICATE OF CORRECTION

| | | |
|---|---|---|
| PATENT NO. | : 7,913,782 B1 | Page 1 of 1 |
| APPLICATION NO. | : 12/189995 | |
| DATED | : March 29, 2011 | |
| INVENTOR(S) | : David A. Foss and Michael R. Trihey | |

It is certified that error appears in the above-identified patent and that said Letters Patent is hereby corrected as shown below:

Title Page, Item [54] and in the Specification, Column 1, line 2, in the Title, delete the word "UNIT" and replace therewith --VEHICLE--.

Signed and Sealed this
Nineteenth Day of November, 2013

Teresa Stanek Rea
*Deputy Director of the United States Patent and Trademark Office*